Figure 1:
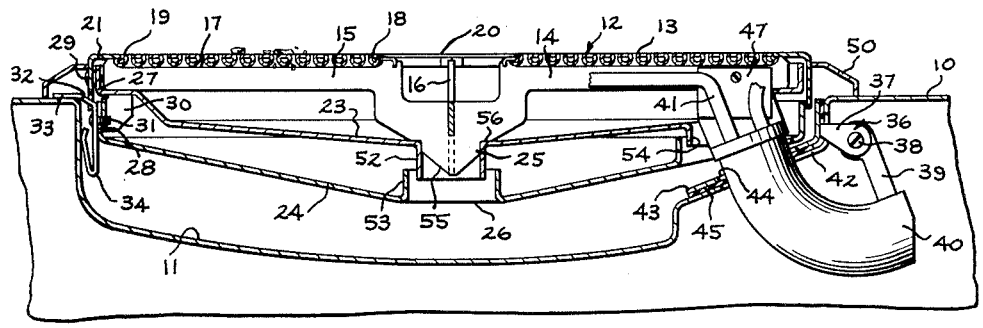

March 9, 1965   N. W. KIRSCHKE ETAL   3,172,995
SURFACE HEATING UNIT FOR SPILL-PROOF COOKTOP
Filed Jan. 3, 1963

INVENTORS
NORMAN W. KIRSCHKE
& BOHDAN HURKO
BY
Richard L. Caslin
THEIR ATTORNEY 3,172,995
SURFACE HEATING UNIT FOR SPILL-PROOF
COOKTOP
Norman W. Kirschke and Bohdan Hurko, Louisville, Ky.,
assignors to General Electric Company, a corporation
of New York
Filed Jan. 3, 1963, Ser. No. 249,160
5 Claims. (Cl. 219—463)

The present invention relates to an electric surface heating unit for use with a spill-proof cooking surface where the surface is protected from excessive heat and food spillage is substantially eliminated by pyrolysis.

The standard electric range is provided with a top cooking surface having a plurality of large spaced holes formed therethrough, each hole for receiving a reflector pan that also includes a large central hole. A heating element is mounted across the top surface of the pan and a hinge means is provided so that the element may be pivoted to a raised position and the reflector pan removed so that a drip box located beneath the cooking surface can be maintained clean by scrubbing periodically. One advantage in having the large holes in the cooking surface is that only a small amount of heat is lost from the heating elements to the cooking surface. One main disadvantage in having these large openings in the cooking surface is that certain foods and especially liquids used in cooking will spill inadvertently onto the reflector pan and drain out the bottom thereof into the drip box. It is a laborious task to maintain this box clean since it is difficult to reach all areas of the box through the openings, and the visibility is poor. Also, the lead wires for the heating elements are strung under the cooktop within the vicinity of the drip box, and the average housewife is hesitant to touch them during the cleaning.

A principal object of the present invention is to provide an electric surface heating unit for a spill-proof cooktop where the cooktop is protected by multiple reflector pans of the unit from excessive heat which might otherwise do damage to the cooktop surface.

A further object of the present invention is to provide a surface heating element which will allow liquid spillage and small particles of food to pass therethrough when the element is cool but will substantially prevent such materials from passing through the element and accumulating therebeneath when the element is hot.

A further object of the present invention is to provide a surface heating unit with a heating element having one or more reflector pans permanently assembled to the element.

A further object of the present invention is to provide a surface heating element in the form of a flat coil having a supporting framework with limited fastening means with the coil so as to permit the expansion of the coil during its energization without setting up excessive stresses.

A still further object of the present invention is to provide a surface heating unit with multiple reflector pans carried thereby where the innermost pans are self-cleaning by pyrolysis.

The present invention, in accordance with one form thereof, relates to a resistance type electric heating element for use with a spill-proof cooking surface, although it will be appreciated by those skilled in the art that the heating unit could also be applied to standard cooking surfaces having drain holes that allow food spillage to accumulate in a drip box located beneath the cooking surface. This invention, however, provides a maximum advantage when it is used with a spill-proof cooktop that has recesses that are substantially imperforate. The heating unit includes a close-wound, flat-coiled heating element of reduced cross-section so that the heating surface approaches the design of a solid plate heating unit. Located beneath the heating element and permanently carried thereby is a double reflector pan assembly, each pan having a central drain opening so that excessive amounts of food and liquid spillage will not accumulate in the pans, but will drain into the recess in the cooktop. The top pan is closely spaced beneath the heating element thereby reflecting most of the radiant heat, however, the pan absorbs enough of the heat energy from the heating element so that any food spillage thereon will be removed by pyrolysis within a short time so as to be automatically self-cleaning. The bottom pan also serves as a heat reflector pan which will not receive any of the food spillage from the top pan, but merely serves to direct the heat energy back toward the heating element thereby protecting the surface of the recessed cooktop from excessive temperatures that might otherwise cause damage to the surface thereof. This lower pan also keeps the recess in the cooktop beneath the surface unit at a temperature below the temperature as which the food will start to bake onto the surface.

Our invention will be better understood from the following description taken in conjunction with the accompanying drawing and its scope will be pointed out in the appended claims.

Figure 2:
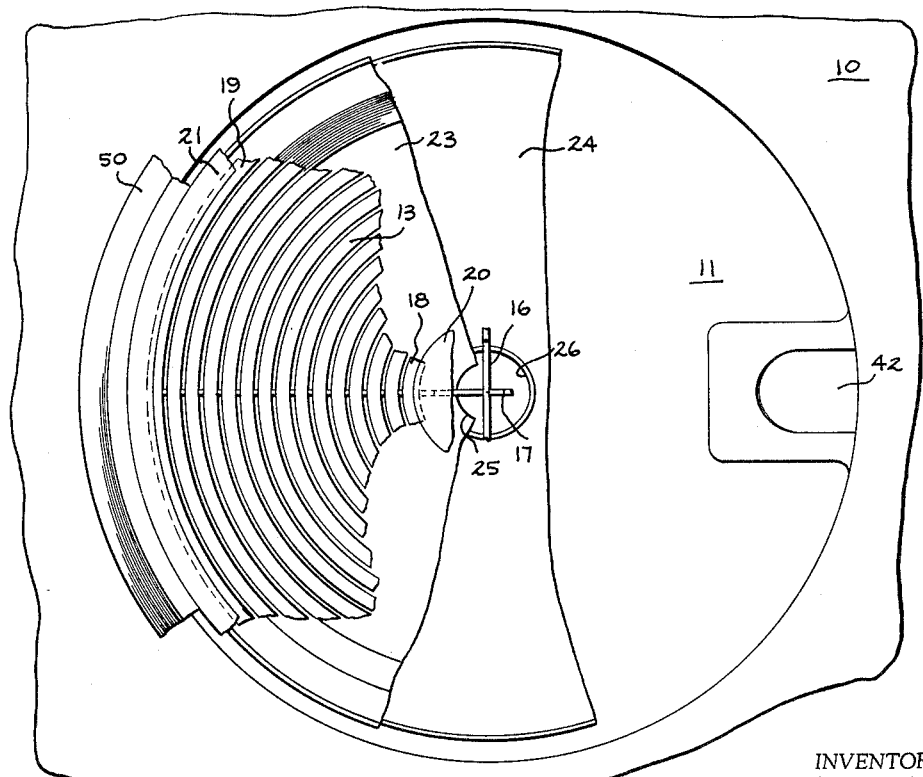

FIGURE 1 is a cross-sectional elevational view through the center of a surface heating unit embodying the present invention, and FIGURE 2 is a top plan view of the heating unit of FIGURE 1 with parts broken away to show the configuration of the several layers of materials which are combined into the present invention.

Turning now to a consideration of the drawing, and in particular to FIGURE 1, 10 represents a portion of the top cooking surface of an electric range or portable heating appliance. The cooking surface or cooktop 10 includes a circular recess 11 over the top of which is to be supported the surface heating unit 12 embodying the present invention. First of the heating unit 12 to be discussed is the metal sheathed heating element 13 which is of standard construction but of novel configuration. The construction has a central resistance heating element (not shown) that is helically wound longitudinally of the element. A suitable electrical insulating material such as magnesium oxide is packed around the resistance element and the overall assembly is covered with a metal sheath. As in standard constructions, the resistance helix stops short of the two ends of the sheath and a large diameter terminal pin (not shown) is connected to each end of the helix to form what is known in the art as a cold terminal, in other words, a terminal which is not part of the heat producing system of the heating element.

It is desirable in the present invention to wind the heating element 13 into a tight flat coil where the adjacent turns of the coil are closely spaced to be less than one-sixteenth of an inch apart, and preferably about .020 inch apart. In so doing, it is important not to restrict the thermal expansion of the heating coil thereby causing permanent warpage of the coil. Hence, it is well to provide special fastening means for the heating element 13 onto a supporting framework 14 that is formed by intersecting strap members 15 and 16. The majority of the turns of the heating element merely rest on the flat surface 17 of the supporting framework 14. It is only the innermost turn 18 and the outermost turn 19 that is fastened to the framework 14. This fastening means is provided by a circular sealing plate or medallion 20 that is clamped over the inner turn 18 of the coil, while the outer turn 19 is held down by a support ring 21, as best seen in FIGURE 1. Both the inner turn 18 and the outer turn 19 of the heating element 13 are formed as cold terminals so as to reduce the operating temperature at the periphery of the heating unit and avoid over-heating the trim ring 50 and the surface of the cook top 10.

Note that both the inner turn 18 and the outer turn 19 have annular depressions in order to receive the sealing plate 20 and the support ring 21 flush with the surface unit so that any pan placed on the surface unit will rest directly on the flat heating element throughout the extent thereof. Actually, both the inner turn 18 and the outer turn 19 of the heating element 13 are cold terminals to provide a radiant heat barrier for the support ring 21 and an appearance trim ring 50 so as to avoid heat discoloration of such rings. The subject of the heating element 13 will be discussed later in greater detail.

Now to be mentioned is the double reflector pan assembly which includes a top pan 23 and a bottom pan 24 that are both fastened to the underside of the heating element. Both pans 23 and 24 are rather similar in configuration in that they are slightly concave upwardly and have a central opening 25 and 26 respectively, as well as a vertical outer peripheral side wall 27 and 28 respectively. The side wall 27 of the upper pan 23 is fastened to the support ring 21 by means of fastening screws 29, while the side wall 28 of the lower pan 24 is suspended from the top pan 23 by means of a series of spaced bracket members 30 and screws 31. By this is meant the top pan 23 is provided with a series of spaced bracket members 30 that extend downwardly from the edge of the top pan and are each provided with a mating surface that bears against the inside of side wall 28 of the bottom pan 24. Suitable holes are formed through the side wall 28 and mating portion of the bracket 30, and threads are formed for receiving the fastening screw 31.

In addition a clip member 32 is supported from the same fastening screw 31, it being understood that there would be a plurality of these clip members located around the periphery of the heating unit. Each clip member has an upper horizontal portion 33 that serves as a support tab, and a lower spring portion in a general hair pin shape as at 34 for bearing against the side wall of the recess 11 in the cooktop 10 and centering the heating unit within the recess. One other element is necessary in order to complete the outward appearance of the heating unit; namely, the removable trim ring 50 which surrounds the support ring 21 and closes the gap between the support ring and the cooktop as is best seen in FIGURE 1.

While on this subject of support means, it is well to mention here that the main support for the heating unit 12 is provided by a hinge member 36 forming a pivotal support between the cooktop 10 and the heating unit 12. This hinge means 36 includes a fixed strap 37, a pivot pin means 38 and a movable strap 39 that is joined to a tubular member 40 through which the terminals 41 of the heating unit are brought out through the cooktop by means of a lateral opening 42 in the side wall of the recess therein. The fixed strap 37 is attached to a mounting plate 43 that is assembled around the opening 42 in the recess and is fastened in place by fastening screws (not shown). This mounting plate 43 has a circular opening 44 through which the tubular member 40 is allowed to swing about the pivotal axis 38 of the hinge means. A gasket 45 of woven asbestos or the like is clamped beneath the mounting ring 43 and it has an undersized opening receiving the tubular member 40 so as to provide a wiping action on the outside of the tubular member 40 as it pivots during the movement of the heating unit 12 from the horizontal position of FIGURE 1 to a substantially vertical position. It will be understood that both the top pan 23 and the bottom pan 24 of the heating unit are each provided with a suitable cooperating opening through which the tubular member 40 may extend so that the member may be attached to the supporting framework 14 of the heating unit as by means of bracket member 47. It is also important to seal the terminals 41 of the heating element within the tubular member 40 in order to obtain a liquid tight seal for the hinge connection.

More of an explanation is necessary of the double pan assembly 23 and 24 because of its relative importance to the success of the overall invention. The central opening 25 in the top pan 23 has a downwardly extending spout or collar 52, while the larger opening 26 in the bottom pan 24 has an upwardly directed collar 53 which is telescoped over the spout 52 to insure that any drainage from the top pan 23 will not enter the bottom pan 24 but instead will fall through the larger opening 26 in the bottom pan and accumulate in the bottom of the recess 11 on the cooktop. A similar arrangement of telescoping spouts or collars are provided for the hinge as at 54. For ease of assembly and for reinforcing purposes the top pan 23 is centered and braced by having the central portions of the strap members 15 and 16 of the supporting framework 14 provided with converging tapers 55 that extend into the opening 25. Slight V-notches 56 in the edges of the converging surfaces serve to receive the edge of the central opening 25 in the top pan. This not only centers the design but adds rigidity to the unit so that the heating unit may support large weights such as heavy canning kettles and the like that are sometimes heated on the heating element of an electric range.

The top reflector pan 23 operates at a high temperature in the vicinity of 1200° F. because of its close proximity to the heating coil 13. One advantage derived from this extreme heat is that food soil that accumulates on the reflector pan will be burned off automatically so that it will not be necessary to disassemble the heating unit in order to maintain the top pan 23 clean. The heating element 13 is so designed that liquid spillage will pass through the gaps between the turns only when the element is relatively cool. Very little liquid will pass between the turns when the element is energized because the gap is of relatively small size and the liquid will be retarded from leaking through and will be evaporated rapidly by the high temperature. As mentioned previously, the top pan 23 is slightly concave so that any liquid that is spilled on a cold surface unit flows between the turns and drops onto the cold reflector pan. Since the reflector pan is cold the major portion of the liquid will flow out through the central drain opening 25 and will not stain the pan. If the liquid could spill onto the top reflector pan 23 when the pan is hot as in standard ranges the liquid would immediately burn in place and become more difficult to clean. It is important to form the top reflector pan 23 out of a material which will have a reflective surface so as to redirect the heat energy away from the recess 11 in the cooktop and back toward the heating element 13. The best material which has been found for this purpose is a calorized steel which is commercially available from Armco Steel Corporation and it has a thin durable surface of silicon oxide and aluminum oxide. This calorized steel will easily withstand the high temperature of 1200° F. and above and it has a relatively low emissivity so that it does not absorb much of the heat energy but will reflect a substantial portion of it back toward the heating element 13 in order to reduce the heat exchange between the surface unit 12 and the cooktop 10 albeit it is hot enough to degrade the spilled food.

The bottom reflector pan 24 must also be made of a reflective material such as aluminized steel, again for protecting the recess portion 11 of the cooktop against excessive heat. As in standard range designs the range body and cooktop 10 are coated with a suitable porcelain enamel. The porcelain will withstand high temperatures if the heat is distributed evenly and it is not subject to sudden temperature changes. As mentioned previously, the spillage of liquids between the turns of the heating element 13 will take place mainly when the element is not energized. In other words the element would be relatively cool so that no harm would come to the porcelain within the recess 11 due to liquids cascading down through the heating element 13 to the top pan 23 and through the bottom pan 24 into the recess. Advantageously, when the heating element 13 is energized and the recess 11 is running hot, there will be little spillage of liquids into the recess because most if not all of the liquids will be evaporated immediately upon contact with the heating element 13 as mentioned previously. Also, the recess temperature will be protected by the lower pan from rising above the temperature at which the food will start to bake onto the surface.

In designing the heater element 13 it was first deemed necessary to closely wind the turns of the coil so as to reduce the spacing between the turns and restrict the amount of liquid spillage into the double reflector pan assembly. It was also deemed important not to increase the thermal mass of the heating element over the thermal mass of a standard heating unit, because a greater thermal mass would decrease the cooking speed as well as increase the time required for cooling down the heating element to room temperature. The efficiency of a surface heating element may be calculated by using the following formula:

$$\eta = \frac{\text{Energy delivered to utensil } (Q)_\mu}{\text{Energy input } (Q_i = I^2R)}$$

where:

$R$ = electrical resistance of the heater coils
$I$ = current passing through the heater coils The difference between $Q_i$ and $Q\mu$ equals the heat losses in the following formula:

$$Q_L = Q_i - Q_\mu$$

For the optimum design of a surface heating unit the amount of heat energy lost should be held to a minimum. Heat losses consist of the following three parts:

(1) Stored heat in the surface unit $Q_1$
(2) Heat losses from the heating element (convection, radiation) $Q_2$
(3) Heat losses from utensil (convection, radiation) $Q_3$. The major portion of heat loss in electrical surface units is due to stored heat $Q_1$ $$Q_1 = Q_H + Q_{MgO} + Q_s$$

where:

$Q_H$ is stored heat in the resistance helix
$Q_{MgO}$ is stored heat in $M_gO$ insulation
$Q_s$ is stored heat in sheath material The formula for stored heat in each of these three different materials is:

$$Q = WC_p\Delta t$$

where:

$W$ = weight of the material
$C_p$ = specific heat of the material
$\Delta t$ = change in temperature Accordingly, it can be understood that the efficiency of the surface heating element is a function of the amount of loss of the heat energy, and that a major part of this heat loss is due to stored heat in the heating element and this stored heat is a direct function of the weight or thermal mass of the heating element. Accordingly, the less the weight or thermal mass of the heating element for any given wattage rating the more efficient the heating unit will be. A surface heating element embodying the present invention has performed under tests with slightly better performance efficiency and speed than standard heating units at the same electrical rating. The temperature of the top surface of the heating element at no-load condition runs approximately 100–200° F. lower than a standard heating element. This can be explained by the fact that at the same thermal mass the element has a much larger surface area through which heat is dissipated. As for example:

|  | Watts | Heater Surface, in.² | Volume | Weight |
| --- | --- | --- | --- | --- |
| Self-cleaning unit | 1,250 | 46.2 | 196 | 7.42 |
| Standard unit | 1,250 | 33.2 | 191 | 7.80 |

This thermal mass can be controlled in the design of the present invention by reducing the cross-sectional size or diameter of the sheathed unit from a standard size of about .238 inch to about .160 inch.

Having described above our invention of a novel surface heating unit for a spill-proof cooktop it will be readily apparent to those skilled in this art that the use of the smaller diameter, closely-wound heating element serves to prevent excessive food spillage through the coils and onto the reflector pans. Also, the double reflector pans serve to reduce the cooktop temperature so that this design will pass the rigid temperature tests conducted by the Underwriters Laboratories Inc., for cooktop surfaces. Moreover, the center of the heating element is sealed to restrict the amount of liquid spillage, while both the inner and outer turns of the heating element are designed as cold terminals so as to provide a radiant heat barrier for the trim ring which encircles the heating unit.

Modifications of this invention will occur to those skilled in this art therefore it is to be understood, that this invention is not limited to the particular embodiments disclosed but that it is intended to cover all modifications which are within the true spirit and scope of this invention as claimed.

What we claim as new and desire to secure by Letters Patent of the United States is:

1. An electric surface heating unit comprising in combination a resistance heating element of reduced transverse cross-section that is close-wound into a flat coil supported on top of an open framework, the innermost turn of the coiled element being a non-heating terminal, the outermost turn of the coiled element also being a non-heating terminal, and fastening means at the center of the coil for holding the inner terminal to the framework, and a support ring surrounding the heating element and holding the outer terminal to the framework so that the thermal expansion of the heating portion of the element between the terminals is not restricted, a pair of vertically spaced pans located beneath the heating element and supported from the support ring, the center of the top pan having a drain opening so that excess liquids will pass therefrom, the bottom pan also having a central drain opening so that the discharge from the top pan will not reach the bottom pan but will pass therethrough, the top pan being closely spaced beneath the heating element so that this pan operates at a high enough temperature to remove any food soil by pyrolysis that might lodge on the top surface of this pan, the bottom pan serving as a heat reflector so as to protect the underside of the heating unit from excessive heat.

2. An electrical surface heating unit comprising in combination a metal sheathed resistance heating element of reduced transverse cross-section that is close-wound into a flat coil supported on top of an open framework, a closure member for sealing the otherwise-open central portion of the coil, a pair of vertically spaced pans located beneath the heating element and supported from the framework, the center of the top pan having a drain opening so that liquids spilled into the top pan will pass therefrom, the bottom pan having a central drain opening in alignment with the first-mentioned drain opening so that the discharge from the top pan will not reach the bottom pan but will pass therethrough, the top pan being closely spaced beneath the heating element so that this pan operates at a high enough temperature to remove any food soil by pyrolysis that might lodge on the top surface of this pan, the bottom pan serving as a heat reflector so as to protect the area beneath the heating unit from excessive heat.

3. An electrical surface heating unit as recited in claim 2 wherein the cross-sectional diameter of the element is between about .120 inch and .180 inch while the spacing between adjacent turns of the heating element is less than about .0625 inch and preferably about .020 inch, the diameter of the heating element being of reduced size so that the thermal mass of the heating element will be approximately equal to or less than the thermal mass of larger diameter widely-spaced coils of heating elements, whereas the close spacing between the turns has been selected to permit liquids to flow between the turns only when the heating element is not up to temperature, while liquids will not pass between the turns when the heating element is near to operating temperatures but the liquid will be evaporated by the high temperature of the heating element thereby protecting the top pan from the heat shock which would otherwise occur if a relatively cool liquid were to spill onto the top pan that is operating at a high temperature approximating the operating temperature of the heating element.

4. A spill-proof cooking surface having a recessed portion, a metal sheathed resistance heating element in a tightly-wound flat coil supported over the recessed portion by an open framework, fastening means for holding the heating element to the said framework, hinge means for connecting the framework to the cooking surface so that the heating element may be raised to a substantially vertical position for ease in cleaning the recess, a support ring surrounding the heating element and fastened to the said framework, a pair of vertically-spaced reflector pans located beneath the heating element and supported from the support ring, the top pan having a drain opening so that liquids spilled into said pan will pass therefrom, the bottom pan having a larger drain opening so that the liquid discharge from the top pan will not reach the bottom pan but will pass therethrough, the top pan having a lower emissivity than the lower pan and being closely spaced beneath the heating element so that the top pan operates at a high enough temperature to remove any food soil from itself by pyrolysis, the bottom pan serving as a heat reflector so as to protect the recessed portion of the cooking surface from excessive heat.

5. An electric heating unit comprising a combination a horizontal cooking surface having a recessed portion, a resistance heating element supported over the recessed portion, the element having a cross-sectional diameter between about .120 inch and .180 inch and being closely wound into a flat coil that is supported on top of an open framework, a closure member for sealing the otherwise-open central portion of the coil, a pair of vertically spaced reflector pans located beneath the heating element and fastened to the said framework, and draining means for each reflector pan so that liquids will not remain in the pans but will flow into the recessed portion.

References Cited by the Examiner
UNITED STATES PATENTS

| | | | |
|---|---|---|---|
| 1,567,870 | 12/25 | Serrell | 219—451 |
| 2,413,477 | 12/46 | Wiegand | 219—463 |
| 3,051,818 | 8/62 | Prather | 219—463 |

RICHARD M. WOOD, *Primary Examiner.*